(12) United States Patent
Trinkenschuh et al.

(10) Patent No.: US 12,017,537 B2
(45) Date of Patent: Jun. 25, 2024

(54) DRIVE UNIT FOR A DRIVE TRAIN OF AN ELECTRICALLY DRIVEN MOTOR VEHICLE AND DRIVE ASSEMBLY

(71) Applicant: Schaeffler Technologies AG & Co. KG, Herzogenaurach (DE)

(72) Inventors: Andreas Trinkenschuh, Bühl (DE); Steffen Lehmann, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 651 days.

(21) Appl. No.: 16/973,136

(22) PCT Filed: Jun. 4, 2019

(86) PCT No.: PCT/DE2019/100496
§ 371 (c)(1),
(2) Date: Dec. 8, 2020

(87) PCT Pub. No.: WO2019/242806
PCT Pub. Date: Dec. 26, 2019

(65) Prior Publication Data
US 2021/0252965 A1   Aug. 19, 2021

(30) Foreign Application Priority Data
Jun. 20, 2018   (DE) .................. 10 2018 114 794.5

(51) Int. Cl.
*B60K 6/387*   (2007.10)
*B60K 6/48*   (2007.10)
(Continued)

(52) U.S. Cl.
CPC ............... *B60K 6/387* (2013.01); *B60K 6/48* (2013.01); *B60K 6/405* (2013.01);
(Continued)

(58) Field of Classification Search
CPC .......... B60K 6/387; B60K 6/48; B60K 6/405; B60K 6/547; B60K 2006/4825; B60Y 2200/92; B60Y 2410/10
See application file for complete search history.

(56) References Cited

U.S. PATENT DOCUMENTS

| | | | |
|---|---|---|---|
| 7,508,100 B2* | 3/2009 | Foster | B60K 6/365 475/5 |
| 7,992,661 B2* | 8/2011 | Nomura | F16F 15/123 180/65.245 |
| 2005/0206251 A1 | 9/2005 | Foster | |

FOREIGN PATENT DOCUMENTS

| CN | 101184645 A | 5/2008 |
|---|---|---|
| CN | 103415410 A | 11/2013 |

(Continued)

OTHER PUBLICATIONS

Volkswagen Ag, "Twin Drive- Ein Schritt in Richtung Elektromobilität," VDI-FVT-Jahrbuch 2009, Germany.
(Continued)

*Primary Examiner* — John D Walters (57) ABSTRACT

A drive unit for a drive train of an electrically driven motor vehicle, in particular a hybrid motor vehicle, comprising a first electric machine, a second electric machine and an output shaft. A rotor of the second electric machine is connected to the output shaft for conjoint rotation. The drive unit also comprises a separating clutch, configured to connect a rotor of the first electric machine to the output shaft for torque transmission. The rotor of one of the electric machines is at least indirectly radially supported on the rotor of the other electric machine by at least one rotary bearing.

8 Claims, 4 Drawing Sheets

(51) Int. Cl.
   *B60K 6/405*   (2007.10)
   *B60K 6/547*   (2007.10)

(52) U.S. Cl.
   CPC ...... *B60K 2006/4825* (2013.01); *B60K 6/547* (2013.01); *B60Y 2200/92* (2013.01); *B60Y 2410/10* (2013.01)

(56) References Cited

FOREIGN PATENT DOCUMENTS

| | | | |
|---|---|---|---|
| CN | 103429450 | A | 12/2013 |
| CN | 103568813 | A | 2/2014 |
| CN | 107640014 | A | 1/2018 |
| CN | 107906189 | A | 4/2018 |
| CN | 111372801 | A | 7/2020 |
| DE | 112006001432 | B4 | 5/2013 |
| DE | 102011089710 | A1 | 6/2013 |
| DE | 102015222690 | A1 | 5/2017 |
| DE | 102015222691 | A1 | 5/2017 |
| DE | 102015222692 | A1 | 5/2017 |
| DE | 102015222694 | A1 | 5/2017 |
| DE | 102017127695 | A1 | 5/2019 |
| DE | 102018103245 | A1 | 5/2019 |
| DE | 102018103336 | A1 | 8/2019 |
| DE | 102019106465 | A1 | 11/2019 |
| JP | 2009166731 | A | 7/2009 |
| WO | 2010095610 | A1 | 8/2010 |
| WO | 2017084887 | A1 | 5/2017 |
| WO | 2017084888 | A1 | 5/2017 |
| WO | 2017084889 | A1 | 5/2017 |

OTHER PUBLICATIONS

Schaeffler Technologies AG& Co. KG, DE102017128289.0, [Unpublished patent application], Germany.

\* cited by examiner

DRIVE UNIT FOR A DRIVE TRAIN OF AN ELECTRICALLY DRIVEN MOTOR VEHICLE AND DRIVE ASSEMBLY

CROSS-REFERENCE TO RELATED APPLICATIONS

This application is the U.S. National Phase of PCT Appln. No. PCT/DE2019/100496 filed Jun. 4, 2019, which claims priority to DE102018114794.5 filed Jun. 20, 2018, the entire disclosures of which are incorporated by reference herein.

TECHNICAL FIELD

The disclosure relates to a drive unit for a drive train of an electrically driven motor vehicle, in particular of a hybrid motor vehicle, as well as to a drive assembly.

BACKGROUND

Drive devices for a hybrid vehicle are known from the prior art, which include, inter alia, an internal combustion engine, a first electric machine and a second electric machine.

DE 10 2015 222 690 A1, DE 10 2015 222 691 A1 and WO 2017 084 887 A1 describe methods for controlling such a drive device, wherein the drive device can be operated in several operating modes.

In DE 10 2015 222 690 A1, a serial hybrid operation is mainly explained in which the traction drive torque is brought about by means of the second electric machine and the internal combustion engine drives the first electric machine to generate electrical energy. It describes how the internal combustion engine is operated at a working point based on a combined efficiency, which depends on the efficiency of the combustion engine and on the efficiency of the first electric machine.

The documents DE 10 2015 222 691 A1 and WO 2017 084 887 A1 describe a performance-oriented and a consumption-oriented mode, wherein each mode is dependent on a condition. This condition involves increasing a target drive value to an intermediate value, which between an internal combustion engine threshold which lies between a maximum drive value in a parallel hybrid operation, in which only the internal combustion engine provides traction drive torque and a parallel hybrid mode threshold, which represent a maximum drive value in the parallel boost hybrid mode.

DE 10 2015 222 692 A1, WO 2017 084 888 A1, DE 10 2015 222 694 A1 and WO 2017 084 889 A1 describe a method for operating a drive device of a hybrid vehicle for driving a drive wheel, wherein the drive device comprises an internal combustion engine, a first electric machine coupled to the internal combustion engine, a second electric machine, an electric accumulator, and a main clutch between the internal combustion engine and the drive wheel.

DE 10 2015 222 692 A1 and WO 2017 084 888 A1 describe that the drive device is operated in one of three operating modes. From a purely electric operation, a serial hybrid operation, or a parallel hybrid operation, the drive torque provided during the change from the first operating mode to the second operating mode corresponds to a suitably selectable course between the drive torque provided before and after the change.

DE 10 2015 222 694 A1 and WO 2017 084 889 A1 disclose that a transmission is also enclosed between the internal combustion engine and the drive wheel. Here the method comprises:

operating the internal combustion engine at a first speed for the first gear in a parallel hybrid mode while a first gear of the transmission is engaged;
changing to a serial hybrid operation;
opening the main clutch;
setting a speed of the internal combustion engine with the main clutch disengaged to a second speed for a second gear of the transmission in the parallel hybrid mode;
engaging the second gear of the transmission;
closing the main clutch; and
changing to the parallel hybrid mode while the second gear is engaged.

From DE 10 2017 128 289.0 (not yet published) is known a drive unit for a drive train of a hybrid vehicle having an internal combustion engine, a first electric machine, a second electric machine, a first transmission stage, and a drive shaft of the first electric machine and/or the second electric machine. Furthermore, the drive unit comprises a transmission subunit, via which the drive shaft of the respective electric machine is coupled or can be coupled to wheel drive shafts. A second transmission stage is coupled to a countershaft unit, wherein the countershaft unit has an integrated clutch and is further connected to the wheel drive shafts such that the internal combustion engine can be coupled to the wheel drive shafts via the second transmission stage depending on the position of this clutch.

DE 10 2017 127 695.5 (also not yet published), discloses a drive train for a hybrid vehicle which has a transmission input shaft which is in an operative relationship via a first partial drive train with a first electric machine and an internal combustion engine for torque transmission and which is in an operative relationship via a second partial drive train with a second electric machine for torque transmission. The second electric machine is permanently connected to the transmission input shaft so as to transmit torque, and the first electric machine and the internal combustion engine can be connected to the transmission input shaft in a coupleable manner for torque transmission. The first electric machine and/or the second electric machine can be designed to be cooled. It is particularly preferred if the cooling is implemented by means of water cooling from a vehicle cooling circuit or by means of oil cooling with transmission oil from the transmission. Furthermore, the separating clutch used can also be designed as an oil-cooled multi-plate clutch.

Furthermore, a respective named document describes a hybrid vehicle that can execute a respective method, wherein the structure of the hybrid vehicle is essentially the same for all named documents.

The hybrid vehicle described repeatedly in the prior art comprises an internal combustion engine, a first and a second electric machine, at least one drive wheel, a main clutch, and a first and a second clutch. The main clutch is enclosed between the internal combustion engine and a drive wheel, the first clutch is provided between the first electric machine and an output shaft of the internal combustion engine, and the second clutch is provided between the second electric machine and a drive wheel.

It is also known that electric machines are arranged to be coaxial within a housing. In this case, an electric machine or the rotor thereof is rotatably mounted on both sides, such mounting preferably being implemented in a wall of the housing.

Figure 1:
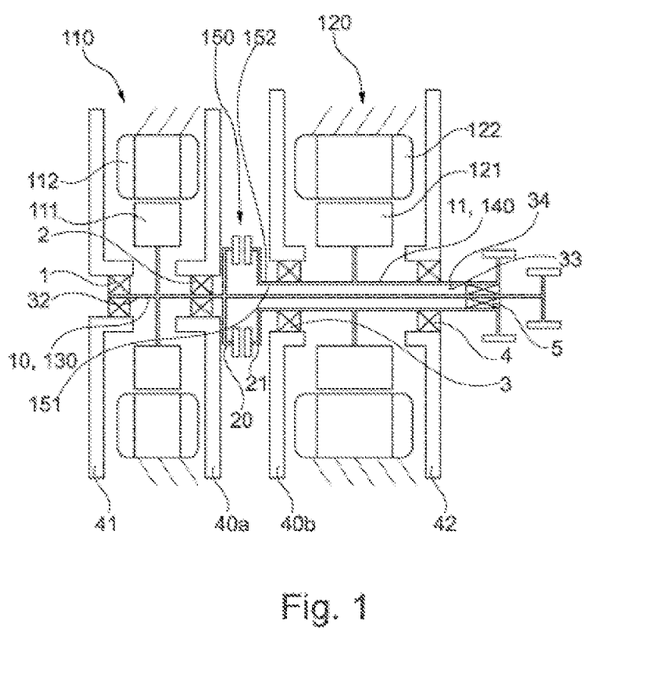
FIG. 1: shows a schematic representation of a drive unit according to the prior art.

An arrangement of two electric machines known from the prior art is shown in FIG. 1. FIG. 1 thus shows a schematic representation of a drive unit.

FIG. 1 shows a first electric machine 110 and a second electric machine 120, which are arranged to be essentially coaxial to one another, and a separating clutch 150, which is arranged in the axial direction between the two electric machines 110, 120.

The first electric machine 110 comprises a first stator 112 and a first rotor 111 mounted on a rotor carrier 10 of the first electric machine 110, wherein the rotor carrier 10 here is a first shaft 130. A housing element in the form of a housing wall 41, 40a is provided in the axial direction on both sides of the first electric machine 110, namely an outer housing wall 41 on the side facing away from the separating clutch 150 and an inner housing wall 40a on the side facing the separating clutch 150. The first shaft 130 is supported via a first rotary bearing 1 of the first electric machine 110 on the outer housing wall 41 and via a second rotary bearing 2 of the first electric machine 110 on the inner housing wall 40a, wherein these rotary bearings 1, 2 are arranged on the radial outer side 30 of the first shaft 130.

The second electric machine 120 comprises a second stator 122 and a second rotor 121 mounted on a rotor carrier 11 of the second electric machine 120, wherein the rotor carrier 11 here is an output shaft 140. The space in which the second electric machine 120 is arranged is delimited in the axial direction on both sides by a housing wall 40b, 42, namely on the side facing away from the separating clutch 150 by an outer housing wall 42 and on the side facing the separating clutch 150 from an inner housing wall 40b. The output shaft 140 is supported via a first rotary bearing 3 of the second electric machine 120 on the outer housing wall 42 and via a second rotary bearing 4 of the second electric machine 120 on the inner housing wall 40b, these rotary bearings 3, 4 being arranged on the radial outer side 32 of the output shaft 140.

The output shaft 140 is designed as a hollow shaft, wherein the first shaft 130 is arranged in sections radially inside the output shaft 140. Furthermore, a rotary bearing 5 of the output shaft 140 is arranged on the radial inner side 31 of the output shaft 140 and the radial outer side 32 of the first shaft 130, thus between the output shaft 140 and the first shaft 130.

The separating clutch 150 is arranged between the first shaft 130 and the output shaft 140, wherein an input element 20 of the separating clutch 150 is connected to the first shaft 130 and an output element 21 of the separating clutch 150 is connected to the output shaft 140, whereby a torque can be transmitted from the first shaft 130 to the output shaft 140 when the separating clutch 150 is closed.

The prior art shown makes it clear that such a mounting variant is associated with a relatively large axial installation space requirement and a high complexity of the housing and housing mass.

It is also possible to design the prior art presented above without a clutch and consequently to do without one of the inner housing walls. However, in such an embodiment it is not possible to at least indirectly couple a rotor carrier of the first electric machine to a rotor carrier of the second electric machine, whereby the drive unit as a whole is limited in the functional diversity thereof compared to the described prior art.

SUMMARY

Proceeding therefrom, the object of the present disclosure is to provide a drive unit that combines a smaller installation space requirement and a longer-lasting mounting.

The object is achieved by the drive unit according to the embodiments described in the disclosure and claims. Advantageous embodiments of the electrical drive unit are listed in the claims and described herein. In addition, a drive assembly is provided.

The features of the claims may be combined in any technically useful way, including the explanations given in the following description and features of the figures which comprise additional embodiments of the disclosure.

In connection with the present disclosure, the terms "axial" and "radial" always refer to the axis of rotation of the drive unit.

The disclosure relates to a drive unit for a drive train of an electrically driven motor vehicle, in particular a hybrid motor vehicle, comprising a first electric machine, a second electric machine, and an output shaft, also referred to as a transmission input shaft, wherein a rotor of the second electric machine is connected to the output shaft for conjoint rotation. Furthermore, the drive unit comprises a separating clutch with which a rotor of the first electric machine and thus an internal combustion engine connected to a first shaft connected to the rotor of the first electric machine for conjoint rotation can be or is connected to the output shaft for torque transmission. It is provided that the rotor of one of the electric machines is at least indirectly supported radially on the rotor of the other electric machine by means of at least one rotary bearing.

It is provided in particular that the two electric machines are arranged in series. In a preferred embodiment, it is provided that the rotors of the two electric machines or the axes of rotation thereof are arranged to be coaxial.

The separating clutch is a switchable clutch that can be switched from an open state to a closed state and vice versa.

The drive unit can be designed such that the first shaft firmly connected to the rotor of the first electric machine is arranged to be radial inside the output shaft firmly connected to the rotor of the second electric machine.

The first shaft can be designed to be divided, namely in the form of a central hollow shaft on which a hub which is connected for conjoint rotation is arranged in some areas, which is also connected to the rotor of the first electric machine for conjoint rotation.

The radial inner side of the separating clutch can thus be connected to the hub on the first electric machine for conjoint rotation, and the radial outer side of the separating clutch can be connected to the output shaft, which is connected to the rotor of the second electric machine for conjoint rotation.

Furthermore, the drive unit can have a transmission which is in operative connection with the output shaft of the drive unit, also referred to as the transmission input shaft, so that a torque provided by the output shaft or the rotary movement realized by the output shaft can be directed stepped up or stepped down via the transmission to a further transmission unit of a motor vehicle, or can also be directed directly to drive wheels of a motor vehicle.

This transmission can comprise a differential transmission or be designed as such.

The transmission can comprise a first gearwheel, which meshes with external toothing on the output shaft. The first gearwheel thus realizes a second transmission stage in the drive unit. This first gearwheel can be coupled to a countershaft of the transmission for conjoint rotation, the external toothing of which in turn meshes with an input gearwheel of a differential transmission, thereby realizing a third transmission stage.

According to an advantageous embodiment, the rotor of the supporting electric machine is supported on a housing wall via the rotor carrier thereof, wherein the rotor of the supported electric machine is supported radially on the respective other rotor carrier.

According to a further embodiment, an input element of the separating clutch is connected to the rotor of the first electric machine for conjoint rotation. The rotor of the first electric machine is supported by this input element of the separating clutch on the output shaft to which the rotor of the second electric machine is connected for conjoint rotation.

As an alternative to the embodiment mentioned above, an output element of the separating clutch can also be connected to the rotor of the second electric machine for conjoint rotation. The rotor of the second electric machine is supported by this output element of the separating clutch on the first shaft to which the first electric machine is connected for conjoint rotation.

The shaft, which is connected to the first rotor for conjoint rotation, is designed to be coaxial within an output shaft which is configured as a hollow shaft and is connected to the second rotor for conjoint rotation.

The rotor of the electric machine, which is not mounted on the rotor of the respective other electric machine, is mounted axially on both sides in the housing of the drive system.

In addition, the object is preferably implemented in such a way that at least one rotary bearing for mounting the rotor of the first electric machine is arranged on the radial inner side of the input element of the separating clutch and on the radial outer side of the output shaft, which is connected to the rotor of the second electric machine for conjoint rotation.

Furthermore, an embodiment provides that at least one rotary bearing for mounting the rotor of the second electric machine is arranged on the radial inner side of the hollow output shaft and on the radial outer side of the first shaft connected to the rotor of the first electric machine for conjoint rotation.

Both rotors of the two electric machines are arranged to be coaxial to one another.

According to a further embodiment, only one inner housing wall is located between the two electric machines in the axial direction, on which only one rotary bearing is arranged for one of the two rotors of the electric machines.

It should not be ruled out that the rotary bearing has several machine elements that form several bearings. In the context of the disclosure, the rotary bearing mentioned here is to be understood as a bearing unit.

In one embodiment of the drive unit in which an input element of the separating clutch is connected to the rotor of the first electric machine for conjoint rotation and the rotor of the first electric machine is mounted on the output shaft by this input element of the separating clutch, it is provided that the separating clutch is arranged to be axial between the first electric machine and the inner housing wall.

In an alternative embodiment, in which an output element of the separating clutch is connected to the rotor of the second electric machine for conjoint rotation and the rotor of the second electric machine is supported by this output element of the separating clutch on the first shaft, it is provided that the separating clutch in the axial direction is arranged between the inner housing wall and the second electric machine.

The nested arrangement of the bearings of the rotors of the electric machines saves axial installation space in the form of a housing wall and nevertheless enables the rotors of the two electric machines to be coupled. According to the disclosure, a drive unit for a drive train of an electrically driven motor vehicle, in particular a hybrid motor vehicle, can thus be made available, which connects two electric machines coupled to one another with an internal combustion engine.

In addition, according to the disclosure, a drive assembly is provided, having a drive unit and an internal combustion engine, wherein the internal combustion engine is coupled or can be coupled for conjoint rotation to the rotor of the first electric machine.

Such a drive assembly is advantageously designed such that a first transmission stage is arranged between the internal combustion engine and a first shaft, which is connected to the rotor of the first electric machine for conjoint rotation, for the purpose of converting the speed of the rotary movement realized by the internal combustion engine on the first shaft.

The output element of the internal combustion engine can be a damper unit, or a clutch for opening and closing the torque transmission path between the internal combustion engine and the drive unit, or a combination of a damper unit and a clutch.

Furthermore, the output element can have an internally toothed gearwheel as a component, which meshes with an external toothing of the first shaft and thus realizes the first transmission stage.

In a further refinement, the drive assembly also comprises at least one wheel drive shaft, which is connected to the output shaft of the drive unit via the transmission, so that a rotary motion realized by the output shaft can be transmitted to the wheel drive shaft by the transmission.

BRIEF DESCRIPTION OF THE DRAWINGS

Embodiments described above are explained in detail below based on the relevant technical background with reference to the associated drawings, which show preferred embodiments. The disclosure is in no way restricted by the purely schematic drawings, while it should be noted that the embodiments shown in the drawings are not limited to the dimensions shown. In the figures.

DETAILED DESCRIPTION

A drive unit 100 according to the disclosure, as shown in FIGS. 2 to 5, comprises a first electric machine 110 and a second electric machine 120, which are arranged to be essentially coaxial to one another, and a separating clutch 150 which is arranged to be axial between the two electric machines 110, 120.

The electric machines 110, 120 each comprise a stator 112, 122 as well as a rotor 111, 121 mounted on a rotor carrier 10, 11. The spaces in which the two electric machines 110, 120 are arranged are delimited on both sides in the axial direction by a housing wall 40, 41, 42 each. Each electric machine 110, 120 is assigned bearings 1, 2, 3, 4, 5 axially arranged on both sides.

The separating clutch 150 is arranged between the first shaft 130 and the output shaft 140, wherein an input element 20 of the separating clutch 150 is connected to the first shaft 130 and an output element 21 of the separating clutch 150 is connected to the output shaft 140, whereby when the separating clutch 150 is closed a torque can be transmitted from the first shaft 130 to the output shaft 140, and in the opposite direction.

Figure 2:
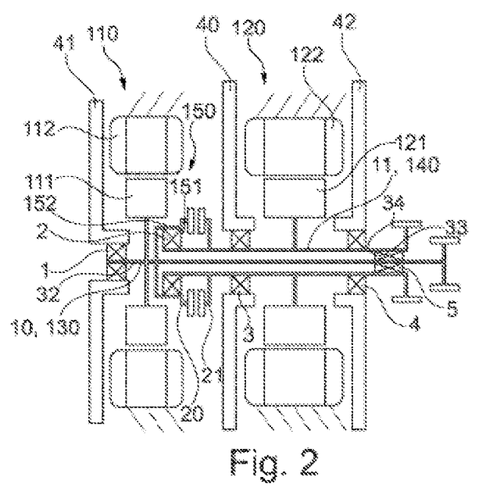
FIG. 2: shows a schematic representation of a drive unit according to the disclosure according to a first variant.

FIG. 2 shows a schematic representation of a drive unit according to the disclosure according to a first variant.

Identical to the embodiment of a drive unit known from the prior art and shown in FIG. 1 is that the space in which the second electric machine 120 is arranged, in the axial direction on the side facing away from the separation coupling 150 from an outer housing wall 42 and on the side facing the separation coupling 150, is delimited by an inner housing wall 40.

Furthermore, the rotor carrier 10 of the first electric machine 110 is a first shaft 130, wherein the rotor carrier 11 of the second electric machine 120 is an output shaft 140. The output shaft 140 is designed as a hollow shaft, wherein the first shaft 130 is arranged in sections to be radial inside the output shaft 140.

The output shaft 140 is supported via a first rotary bearing 3 of the second electric machine 120 on the outer housing wall 42 and via a second rotary bearing 4 of the second electric machine 120 on the inner housing wall 40, wherein these rotary bearings 3, 4 are arranged on the radial outer side 32 of the output shaft 140.

Furthermore, a rotary bearing 5 of the output shaft 140 is arranged on the radial inner side 31 of the output shaft 140 and the radial outer side 32 of the first shaft 130, thus between the output shaft 140 and the first shaft 130.

The first variant of the drive unit 100 according to the disclosure shown differs from the conventional embodiment shown in FIG. 1 essentially in the mounting of the first electric machine 110 and the arrangement of only one housing wall 40 between the two electric machines 110, 120.

The space in which the first electric machine 110 is arranged is delimited on both sides by a housing wall 41, 40, however the first electric machine 110 is only mounted on one of the sides of the separating clutch 150 facing away from the first electric machine 110 in the axial direction on the outer housing wall 41 of the first electric machine 110. On the axially opposite side, the first electric machine 110 is supported there by an input element 20 of the separating clutch 150 connected thereto for conjoint rotation on the output shaft 140 connected to the rotor 121 of the second electric machine 120 for conjoint rotation.

The mounting on the outer housing wall 41 assigned to the first electric machine 110 is implemented by a first rotary bearing 1 of the first electric machine 110 and the mounting on the output shaft 140 is implemented by a second rotary bearing 2 of the first electric machine 110.

The first rotary bearing 1 of the first electric machine 110 is arranged on the radial inner side 151 of the input element 20 of the separating clutch 150 and on the radial outer side 32 of the output shaft 140, which is connected to the rotor 121 of the second electric machine 120 for conjoint rotation.

The separating clutch 150 is thus arranged in the axial direction between the first electric machine 110 and the inner housing wall 40.

Figure 3:
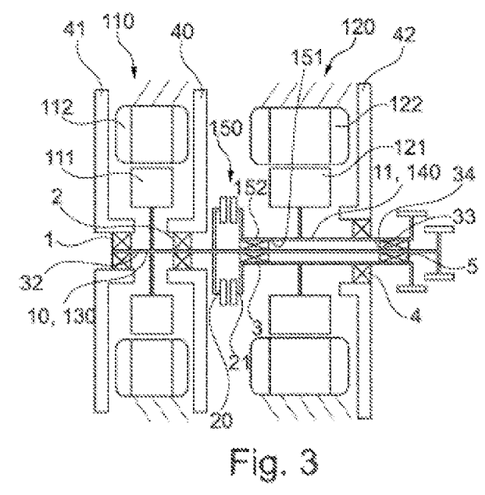
FIG. 3: shows a schematic representation of a drive unit according to the disclosure according to a second variant.

Alternatively to the embodiment shown in FIG. 2, FIG. 3 shows a schematic illustration of a drive unit according to the disclosure according to a second variant.

Identical to the embodiment of a drive unit known from the prior art and shown in FIG. 1 is that the space in which the first electric machine 110 is located, in the axial direction on the side facing away from the separation clutch 150 from an outer housing wall 41 and on the side facing the separation clutch 150, is delimited by an inner housing wall 40.

Furthermore, the rotor carrier 10 of the first electric machine 110 is a first shaft 130, wherein the rotor carrier 11 of the second electric machine 120 is an output shaft 140. The output shaft 140 is designed as a hollow shaft, wherein the first shaft 130 is arranged in sections to be radial inside the output shaft 140.

The first shaft 130 is mounted on the outer housing wall 41 via a first rotary bearing 1 of the first electric machine 110 and on the inner housing wall 40 via a second rotary bearing 2 of the first electric machine 110, wherein these rotary bearings 1, 2 are arranged on the radial outer side 30 the first shaft 130.

Furthermore, a rotary bearing 5 of the output shaft 140 is arranged on the radial inner side 31 of the output shaft 140 and the radial outer side 32 of the first shaft 130, thus between the output shaft 140 and the first shaft 130.

The second variant shown of the drive unit 100 according to the disclosure differs from the conventional embodiment shown in FIG. 1 essentially in the mounting of the second electric machine 120 and the arrangement of only one housing wall 40 between the two electric machines 110, 120.

The space in which the second electric machine 120 is accommodated is delimited on both sides by a housing wall 40, 42, but is only supported on the outer housing wall 42 on one side of the second electric machine 120 facing away from the separating clutch 150 in the axial direction. On the axially opposite side, the second electric machine 120 is mounted on the first shaft 130 by an output element 21 of the separating clutch 150 connected thereto for conjoint rotation.

The mounting on the outer housing wall 42 is implemented by a second rotary bearing 4 of the second electric machine 120 and the mounting on the first shaft 130 is implemented by a first rotary bearing 3 of the second electric machine 120.

The first rotary bearing 3 of the second electric machine 120 is arranged on the radial inner side 151 of the hollow output shaft 140 and on the radial outer side 30 of the first shaft 130 that is connected to the rotor 111 of the first electric machine 110 for conjoint rotation.

The separating clutch 150 is thus arranged in the axial direction between the inner housing wall 40 and the second electric machine 120.

Figure 4:
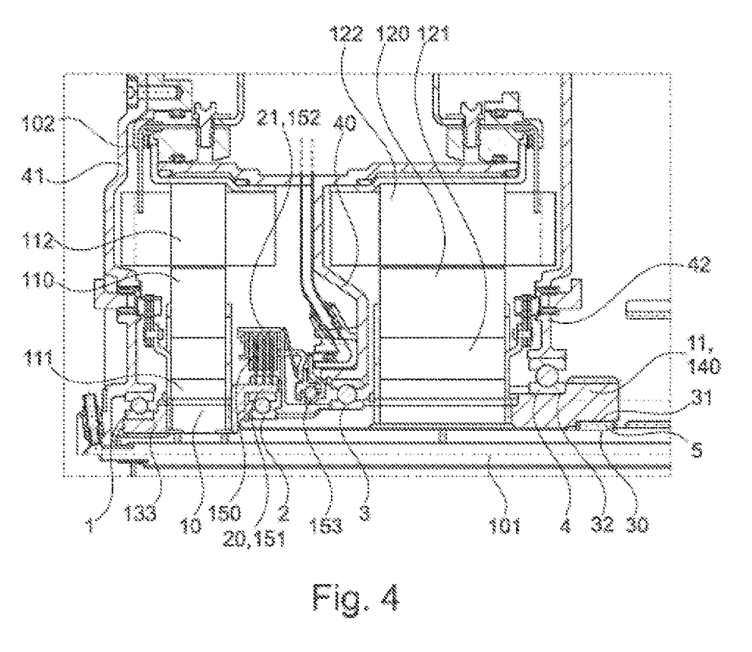
FIG. 4: shows a section of a drive unit according to the disclosure

FIG. 4 shows a section of a drive unit 100 according to the disclosure, wherein the drive unit 100 shown in FIG. 4 essentially corresponds to that shown schematically in FIG. 2. The structure of the drive unit 100 shown in FIG. 4 is thus essentially equivalent to the embodiment of the drive unit 100 according to the disclosure explained in relation to FIG. 2.

Furthermore, the axis of rotation 101 can be seen, about which the rotating elements of the drive unit 100 rotate.

It is shown here that the first shaft 130 is designed to be divided, namely in the form of a centrally running hollow shaft 132 on which is arranged a hub 133 connected for conjoint rotation.

The rotor carrier 10 of the first electric machine 110 is implemented here by the hub 133 which is encompassed by the first shaft 130 and which is arranged on the radial outer side 30 of the centrally running hollow shaft 132. The mounting of the first electric machine 110 is also carried out between the hub 133 and the outer housing wall 41 and between an input element 20 of the separating clutch 150 and the output shaft 140, which is enclosed by the hub 133.

The outer housing walls 41, 42 and the inner housing wall 40 are components of the housing 102.

The separating clutch 150 illustrated here is connected with the radial inner side 151 thereof to the first shaft 130 or the hub 133 and with the radial outer side 152 thereof to the output shaft 140. Furthermore, an actuating element 153 for actuating the separating clutch 150 is shown to be essentially axial between the separating clutch 150 and the inner housing wall 40.

Figure 5:
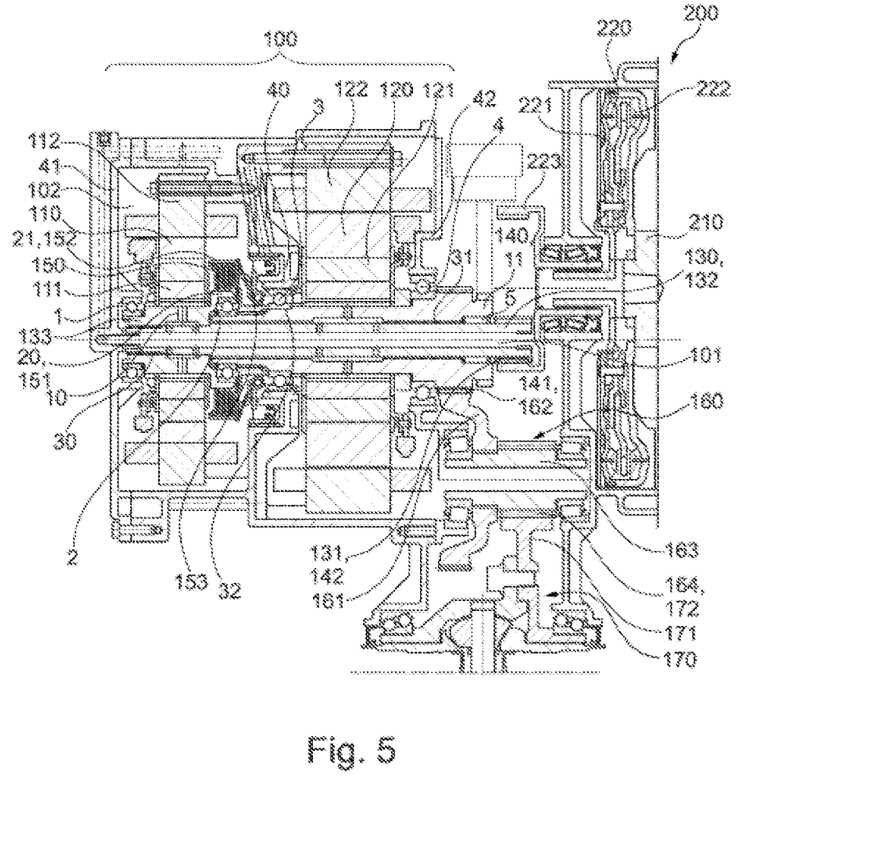
FIG. 5: shows a drive unit according to the disclosure with two electric machines

FIG. 5 shows a drive unit 100 for a drive train of an electrically driven motor vehicle, in particular a hybrid vehicle, which has a first electric machine 110 and a second electric machine 120, both of which are arranged on a common axis of rotation 101. The rotor 111 of the first electric machine 110 is arranged to be coaxial to the axis of rotation 101 and also to the rotor 121 of the second electric machine 120.

The stator 112 of the first electric machine 110 and also the stator 122 of the second electric machine 120 are accommodated in a housing 102 of the drive unit 100.

The rotor 111 of the first electric machine is connected to a first shaft 130 for conjoint rotation.

The rotor 121 of the second electric machine 120 is connected to an output shaft 140 for conjoint rotation, which can also be referred to as a transmission input shaft.

The drive unit 100 shown in FIG. 5 is designed essentially in accordance with the drive unit 100 shown in FIG. 4.

Accordingly, the first electric machine 110 is connected to the outer housing wall 41 of the first electric machine 110 by means of the first rotary bearing 1 of the first electric machine 110 and, by means of the second rotary bearing 2 of the first electric machine 110 through the input element 20 connected to the first electric machine 110 separating clutch 150, is mounted on the hollow output shaft 140 which is connected to the rotor 121 of the second electric machine 120 for conjoint rotation. The second electric machine 120 is supported by a first rotary bearing 3 of the second electric machine 120 on the inner housing wall 40 of the housing 102 and by a second rotary bearing 4 of the second electric machine 120 on the outer housing wall 42 of the second electric machine 120. The separating clutch 150 is arranged in the axial direction between the first electric machine 110 and the second electric machine 40.

Furthermore, the drive unit 100 comprises a separating clutch 150, by means of which the first electric machine 110, and thus an internal combustion engine connected for conjoint rotation to the first shaft 130, connected to the rotor 111 of the first electric machine 110, is connectable or connected to the output shaft for the purpose of torque transmission.

In the embodiment shown here, the first shaft 130 is designed in two parts, namely made up of a central hollow shaft 132 and a hub 133 positioned on this hollow shaft 132 and connected thereto for conjoint rotation, wherein the hub 133 is also connected to the rotor 111 of the first electric machine 110 in a fixed manner.

The hub 133 forms the radial inner side 151 of the separating clutch 150, or is firmly connected to this input side of the separating clutch 150.

The radial outer side 152 of the separating clutch 150, which realizes the output side of the separating clutch 150, is connected for conjoint rotation to the output shaft 140.

The separating clutch 150 is a switchable clutch that can be switched from an open state to a closed state and vice versa. For this purpose, the separating clutch 150 is assigned an actuation system 153.

In this way, when the separating clutch 150 is closed, a torque can be transmitted from the first shaft 130 to the output shaft 140 or vice versa.

In the embodiment shown here, it is thus provided that the two electric machines 110, 120 are arranged in series, wherein the rotors 111, 121 of the two electric machines 110, 120 or the axes of rotation thereof are arranged to be coaxial.

The first shaft 130 or the centrally extending hollow shaft 132 thereof extends radially inside the output shaft 140, whereby the overall installation volume required for the drive unit 100 can be made small.

Furthermore, the drive unit 100 shown here comprises a transmission 160 which is in operative connection with the output shaft 140 of the drive unit 100, also referred to as the transmission input shaft, so that a torque made available by the output shaft 140 or the rotary movement realized by the output shaft 140 can be directed to be stepped up or stepped down via the transmission 160 to a further transmission unit of a motor vehicle, or can also be directed directly to drive wheels of a motor vehicle.

In the embodiment shown here, this transmission 160 comprises a differential transmission 170.

Furthermore, the transmission 160 comprises a first gearwheel 161, which meshes with an external toothing 141 on the output shaft 140. A second transmission stage 162 is thus realized in the drive unit 100 by the first gearwheel 161. This first gearwheel 161 is coupled to a countershaft 163 of the gear 160 for conjoint rotation, the external toothing 164 of which in turn meshes with an input gear 171 of the differential gear 170, thereby realizing a third transmission stage 172.

The drive unit 100 is part of a likewise illustrated embodiment of a drive assembly 200 according to the disclosure.

This drive assembly 200 additionally has an internal combustion engine, not shown here, which when connected to the connection 210 shown, is coupled to the rotor 111 of the first electric machine 110 for conjoint rotation via the first shaft 130 or—with the interposition of a further coupling—can be coupled thereto.

The illustrated drive assembly 200 is designed in such a way that a first transmission stage 142 is formed between the connection 210 for an internal combustion engine, not shown here, and the first shaft 130, which is connected to the rotor 111 of the first electric machine 110 for conjoint rotation for the purpose of stepping up the speed of the rotary movement realized by the internal combustion engine or the connection 210 thereof on the first shaft 130.

For this purpose, an output element 220 of the internal combustion engine is provided, which can have a damper unit 221 or a clutch 222 for opening and closing the torque transmission path between the internal combustion engine and the drive unit 100, or a combination shown of a damper unit 221 and a clutch 222.

Furthermore, the output element 220 comprises an internally toothed gearwheel 223 as a component, which meshes with an external toothing 131 of the first shaft 130 and thus realizes a first transmission stage 142.

It can be seen that, in the exemplary embodiment shown here, an axis of rotation of the output element 220 is offset laterally to the axis of rotation 101 of the drive unit 100.

In this way, a rotary movement generated by the internal combustion engine, not shown here, can be directed via the output element 220 and the first transmission stage 142 on the first shaft 130, so that the rotor 111 of the first electric machine 110 located thereon can be set in rotary movement to operate as a generator.

When the separating clutch 150 closes, the applied rotary movement can be transmitted from the first shaft 130 to the output shaft 140, possibly amplified by an electric motor drive through the first electric machine 110. Because of the conjointly rotating connection of the rotor 122 of the second electric machine 120 to the output shaft 140, a torque provided by the second electric machine 120 can also be applied to the output shaft 140.

Alternatively, when the separating clutch 150 is opened, only the second electric machine 120 can be operated alone to rotate the output shaft 140.

The rotary movement of the output shaft 140 is directed via the external toothing 141 thereof to the first gear 161 of the connected gear 160, wherein the second transmission stage 162 is realized.

From the first gear 161, the torque or the rotary movement is directed to the countershaft 163, from which it is transferred to the differential transmission 170 via the input gearwheel 171.

The torque is transferred from the differential transmission 170 to the wheel drive shafts (not shown here) or, if necessary, a further transmission to step up or step down the torque or the speed.

The depicted drive assembly 200 allows a realization of a wide variety of driving states, such as operating the internal combustion engine alone to drive a motor vehicle, or also with the addition of the second electric machine 120 and/or the first electric machine 110, as well as a simultaneous generator operation of the first electric machine 110 during operation of the internal combustion engine and/or the second electric machine 120, as well as a sole operation of the second electric machine 120, or also a recuperation operation of the first electric machine 110 and/or of the second electric machine 120.

With the embodiment according to the disclosure of the drive unit proposed here, a device is made available which combines a small installation space requirement with reliable and longer-lasting mounting.

LIST OF REFERENCE NUMBERS

1 First rotary bearing of the first electric machine
2 Second rotary bearing of the first electric machine
3 First rotary bearing of the second electric machine
4 Second rotary bearing of the second electric machine
5 Rotary bearing of the output shaft
10 Rotor carrier of the first electric machine
11 Rotor carrier of the second electric machine
20 Input element of the separating clutch
21 Output element of the separating clutch
30 Radial outer side of the first shaft
31 Radial inner side of the output shaft
32 Radial outer side of the output shaft
40 Inner housing wall
40a Inner housing wall on the first electric machine
40b Inner housing wall on the second electric machine
41 Outer housing wall on the first electric machine
42 Outer housing wall on the second electric machine
100 Drive unit
101 Axis of rotation
102 Housing of the drive unit
110 First electric machine
111 Rotor of the first electric machine
112 Stator of the first electric machine
120 Second electric machine
121 Rotor of the second electric machine
122 Stator of the second electric machine
130 First shaft
131 External toothing of the first shaft
132 Central hollow shaft
133 Hub
140 Output shaft
141 External toothing of the output shaft
142 First transmission stage
150 Separating clutch
151 Radial inner side of the separating clutch
152 Radial outer side of the separating clutch
153 Actuation system
160 Transmission
161 First gearwheel
162 Second transmission stage
163 Countershaft
164 External toothing of the countershaft
170 Differential transmission
171 Input gearwheel
172 Third transmission stage
200 Drive assembly
210 Connection for an internal combustion engine
220 Output element
221 Damper unit
222 Clutch
223 Internally toothed gearwheel

The invention claimed is:

1. A drive unit for a drive train of an electrically driven motor vehicle, the drive unit comprising:
   a first electric machine having a rotor;
   a second electric machine having a rotor;
   an output shaft, wherein the rotor of the second electric machine is connected to the output shaft for conjoint rotation, and wherein the drive unit further comprises a separating clutch configured to connect the rotor of the first electric machine to the output shaft for torque transmission, wherein the rotor of one of the electric machines is at least indirectly radially supported on the rotor of the other electric machine by at least one rotary bearing, wherein:
   an output element of the separating clutch is connected to the rotor of the second electric machine for conjoint rotation,
   the rotor of the second electric machine is supported by the output element of the separating clutch on a first shaft connected to the first electric machine for conjoint rotation, and
   at least one rotary bearing for mounting the rotor of the second electric machine is arranged on a radial inner side of the output shaft designed to be hollow and on a radial outer side of the first shaft connected to the rotor of the first electric machine for conjoint rotation.

2. The drive unit according to claim 1, wherein:
   the rotor of the other electric machine is supported on a housing wall via a rotor carrier thereof, and
   the rotor of the supported electric machine is supported radially on a second rotor carrier.

3. The drive unit according to claim 1, wherein:
   an input element of the separating clutch is connected to the rotor of the first electric machine for conjoint rotation, and
   the rotor of the first electric machine is supported by the input element of the separating clutch on the output shaft connected to the rotor of the second electric machine for conjoint rotation.

4. The drive unit according to claim 3, wherein:
at least one rotary hearing for mounting the rotor of the first electric machine is arranged on a radial inner side of the input element of the separating clutch and on a radial outer side of the output shaft, which is connected to the rotor of the second electric machine for conjoint rotation.

5. The drive unit according to claim 1, wherein:
only one inner housing wall is located between the two electric machines in an axial direction, on which is arranged only one rotary bearing for one of the two rotors of the electric machines.

6. The drive unit according to claim 5, wherein:
the separating clutch is arranged in the axial direction between the first electric machine and the inner housing wall.

7. The drive unit according to claim 5, wherein:
the separating clutch is arranged in the axial direction between the inner housing wall and the second electric machine.

8. A drive assembly with a drive unit according to claim 1 and with an internal combustion engine which is coupleable to the rotor of the first electric machine for conjoint rotation.

* * * * *